United States Patent [19]

Kellogg et al.

[11] 4,434,394
[45] Feb. 28, 1984

[54] CIRCUIT FOR CONTROLLING MULTIPLE RATED MOTORS

[75] Inventors: Walter J. Kellogg, Brighton Township, Beaver County, Pa.; Arden L. Scott, La Crescenta; Samuel K. Seneadza, Carson, both of Calif.

[73] Assignee: Westinghouse Electric Corp., Pittsburgh, Pa.

[21] Appl. No.: 433,494

[22] Filed: Oct. 8, 1982

Related U.S. Application Data

[63] Continuation of Ser. No. 178,047, Aug. 14, 1980, abandoned.

[51] Int. Cl.³ .............................................. H02P 1/26
[52] U.S. Cl. .................................... 318/771; 318/805
[58] Field of Search ............... 318/332, 337, 430, 474, 318/523, 529, 536, 779, 785, 786, 787, 788, 789, 793, 798, 775, 776, 777, 434, 423, 424, 350, 351, 352, 704, 716-719, 771, 778, 805; 361/31

[56] References Cited

U.S. PATENT DOCUMENTS

| | | |
|---|---|---|
| 1,467,745 | 9/1923 | Zederbohm ........................ 318/771 |
| 1,481,372 | 1/1924 | Hunter .............................. 318/771 |
| 1,571,152 | 6/1926 | Whittingham .................... 318/771 |
| 1,778,976 | 10/1930 | Hunter ........................... 318/771 X |
| 1,927,208 | 9/1933 | Gay ................................... 318/771 |
| 2,709,775 | 5/1955 | Del Carlo ......................... 318/771 |
| 3,018,649 | 1/1962 | Barbulesco et al. ........... 318/793 X |
| 3,116,445 | 12/1963 | Wright ............................ 318/786 |
| 3,119,951 | 6/1964 | Davy ................................. 361/31 |
| 3,307,093 | 2/1967 | Wright ............................ 318/786 |
| 3,549,970 | 12/1970 | Lewus ............................. 318/787 |
| 3,728,601 | 4/1973 | Fricker et al. .................. 318/787 |
| 3,842,327 | 10/1974 | Wexler ............................ 318/786 |
| 4,035,701 | 7/1977 | Jensen ............................. 318/771 |

Primary Examiner—Ulysses Weldon
Attorney, Agent, or Firm—Benjamin Hudson, Jr.

[57] ABSTRACT

A circuit comprising a load sensor connected to a multiple rated motor for monitoring the motor load demand and a switching apparatus connected to the source of electrical power for changing the connection of electrical power to the windings of the motor under load in response to the motor load demand.

3 Claims, 4 Drawing Figures

HIGH TORQUE CONNECTION

MEDIUM TORQUE CONNECTION

LOW TORQUE CONNECTION

CIRCUIT FOR CONTROLLING MULTIPLE RATED MOTORS

This is a continuation of application Ser. No. 178,047, filed Aug. 14, 1980 now abandoned.

BACKGROUND OF THE INVENTION

1. Field of the Invention

This invention relates to control circuits used for controlling multiple rated motors where the application of the motor requires that the horsepower and torque ratings vary with time.

2. Description of the Prior Art

Multiple rated motors give the user a choice of operating modes so that the most effective operation can be obtained by loads that have variant horsepower and torque requirements during operation. As the load demands vary with time conventional polyphase motors have proven to be less efficient and economical. A varying load can also put additional mechanical stress on the conventional polyphase motors. Multiple rated motors give the user a motor whose speed torque characteristics can vary with the changing demand. However, sophisticated controls are required to shift the motor from one operating mode to another in accordance with the load conditions to attain the more economical and efficient operation.

A reference of interest is a paper entitled "Electric Motor Drives For Oil Well Walking Beam Pumps", written by R. F. Woll, Fellow IEEE, Medium Motor And Gearing Division, Westinghouse Electric Corporation, Buffalo, N.Y. which is copyrighted material of the IEEE and designated Conference Record 76 CH1109-8-1A, Paper No. PC 1-76-33.

SUMMARY OF THE INVENTION

This application provides an invention with a load sensing means connected to a multiple rated motor for monitoring the motor load demand and a switching means connected to the source of electrical power for changing the connection of electrical power to the windings of the motor under load in response to the motor load demand. This invention has particular application for use as an electric motor drive for oil well walking beam pumps where the motor must have sufficient lock rotor torque for initial startup when lubricants in the overall pumping system may be cold and stiff. A fundamental purpose of the multiple rated motor is to afford a choice of operating modes so that the most effective operation can be attained from the motor on the particular beam pump it drives. This is accomplished by running the motor in the torque mode in which it can achieve initial startup and in which its inherent thermal protection does not take if off the line during operation. After initial startup it may be desirable to shift the pump into another torque mode to achieve maximum speed as the loading torque decreases.

DESCRIPTION OF THE PREFERRED EMBODIMENT

Figure 2:
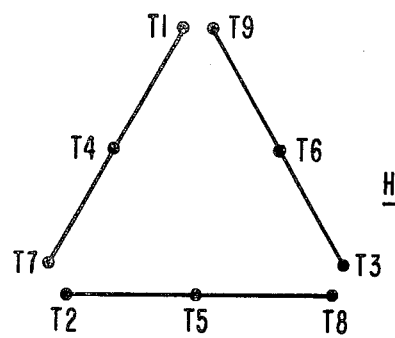
FIGS. 2, 3 and 4 illustrate the winding connections for a triple rated motor.
Figure 3:
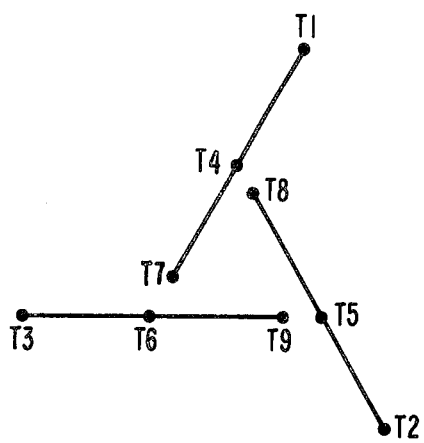
Figure 4:
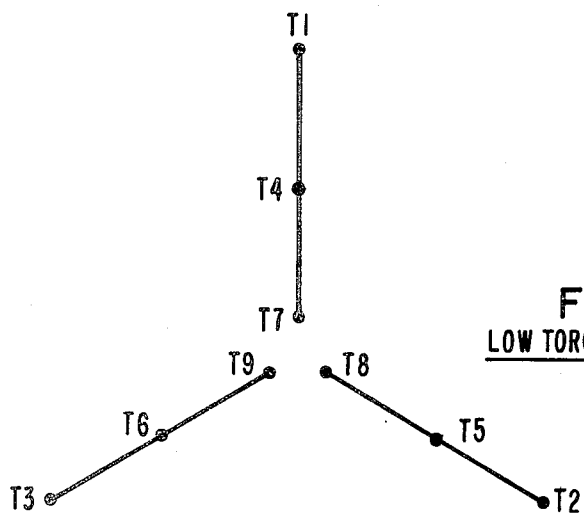

Referring to FIGS 2, 3 and 4 there is shown the winding connections for the three operating modes for a triple rated motor controlled in accordance with the principles of this invention. FIG. 2 shows the connection for the high torque mode, FIG. 3 the connection for the medium torque mode, and FIG. 4 the connection for the low torque mode. The torque output of the wye low torque mode is one-third that of the delta high torque mode, the normal torque relationship between wye and delta connection on a given motor. The torque output of the medium torque connection depends upon how much of the motor winding is in the delta portion of the combination connection. Although FIG. 3 shows half the motor winding in the delta portion, more or less of the winding (within certain limitations) can be in the delta portion. The more in the delta portion, the closer the medium torque output is to that of the full delta high torque connection; the less in the delta portion, the closer the medium torque output is to that of the plain wye load torque connection.

Figure 1:
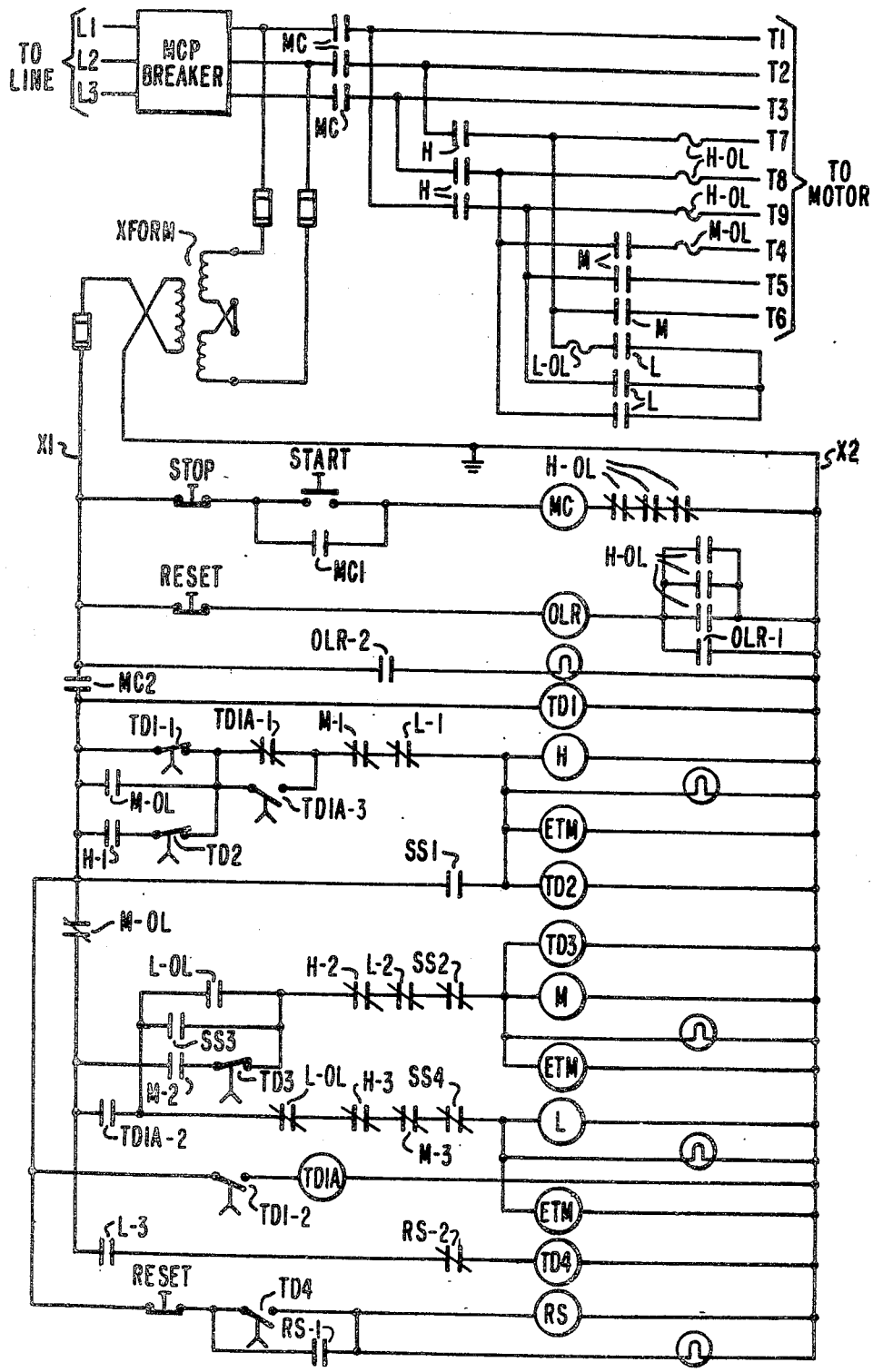
FIG. 1 illustrates one embodiment of a control scheme for a triple rated motor in accordance with the principles of this invention.

FIG. 1 illustrates one embodiment of a control schematic utilized for changing the motor terminal connections for shifting from one torque mode to another. Electrical power is connected to the line terminals L1, L2 and L3 and passes through a conventional motor circuit breaker MCP or other circuit protection and disconnect devices. From the main circuit breaker MCP power passes through the contactor MC to terminals T1, T2 and T3. Connected to the load side of the contactor MC is a high mode contactor H which connects electrical power through three overloads to motor terminals T7, T8 and T9. Also connected to the load side of the high mode contactor H is the medium mode contactor M which connects power to terminals T4, T5 and T6. Finally, a wye connection is connected to the load side of the high mode contactor H through an overload and parallel to the low mode contactor M. Control power is supplied in a conventional manner by connecting a step-down transformer to the line terminals L1 and L2. Control of the motor is initiated by first depressing the start pushbutton and completing the circuit X1, stop pushbutton, start pushbutton, the motor starter coil MC, the three overloads, H-OL and X2. When the motor starter MC is energized, the contact MC-1 closes and latches the start pushbutton in the start position and MC-2 closes and energizes the timer TD1 by completing the circuit X1, MC-2, TD1, and X2. At the same time MC-2 energizes the H contactor for the high torque mode by connecting X1, TD1-6, TD1A-1, M-1, L-1, H, and X2. At this point power is connected to the motor from L1, L2, L3, the circuit breaker MCP, contactor MC, to terminals T1, T2 and T3. The high mode contactor H in its energized position connects terminal T7 to terminal T2, terminal T8 to terminal T3, and terminal T9 to terminal T1 through three overloads sized to protect the motor in the high mode state. As can be seen in FIG. 2 the high torque mode contactor connects the windings into a full delta configuration. Monitoring means shown here as an incandescent light may be paralleled with the H contactor to show that the motor is now running in the high torque mode. Also an elapsed time meter designated ETM may be parallel with the H contactor to measure the total amount of time that the motor runs in the high torque configuration.

After the motor has run in the high mode for a predetermined time set on the time delay relay TD1, TD1 energizes TD1A by completing the circuit X1, TD1-2, TD1A, X2. TD1A deenergizes the high mode circuit X1, TD1-1, TD1A-1, M-1, L-1, H, X2 and energizes low mode circuit X1, M-OL, TD1A-2, L-OL, H-3, M-3, SS4, L, X2. It will be noted that an interlock L-1 is in series with the high mode contactor H to prevent operation in the high mode when the low mode circuit is energized. The low mode has similar monitoring and elapsed time meters parallel with the low mode contactor L as previously described. As can be seen in FIG. 1, when the low mode contactor L is energized, terminals T7, T8 and T9 are shorted together through the low overload to form a wye connection which connects the motor windings in a wye configuration shown in FIG. 4 for the low torque mode connection. A timer TD4 is energized by the low mode contactor L by completing the circuit X1, M-OL, L-5, RS-2, TD4, X2. This time delay relay allows the operator to set a predetermined time for running the motor in the low torque mode. After the time set on the timer TD4 has elapsed, the timer energizes an alarm monitor shown here as an incandescent lamp by completing the circuit X1, reset pushbutton, TD4, incandescent lamp, X2. A reset relay RS is also energized and contact RS-1 bypasses the delay contact TD4 and latches the light in the ON position. The normally closed contact RS-1 deenergizes the timer TD4 and resets it. The reset pushbutton is provided so that the operator can acknowledge the alarm condition and turn off the light by disconnecting the alarm circuit.

If while operating in the low torque mode, loading on the motor should be increased, the low torque mode overload L-OL senses an increase in current and disconnects the low mode contactor by opening the circuit X1, M-OL, TD1A-2, L-OL, H-3, M-3, SS-4, L, X2, and energizes the medium torque mode contactor M by completing the circuit X1, M-OL, TD1A-2, L-OL, H-2, L-2, SS2, M, X2. The medium mode contactor M connects terminal T7 to terminal T6, terminal T8 to terminal T4 and terminal T9 to terminal T5 to form a partial delta partial wye configuration as shown in FIG. 3. Time delay relay TD3 is parallel with the medium mode contactor M and time delay contact TD3 bypasses the low overload by completing the circuit X1, M-2, TD3, H-2, L-2, SS-2, M, X2 and allows the motor to run in the medium torque mode for a predetermined time limit. When the time set on the time delay relay TD3 expires, the time delay relay contact TD3 opens and shifts the motor from the medium torque mode by opening the medium mode contactor M circuit and with the low overload contacts now closed, the motor again runs in the low mode by energizing the low mode contactor with the circuit X1, M-OL, TD1A-2, L-OL, H-3, M-3, SS4, L, X2. If heavy loading still persists in the low torque mode, the low torque mode overloads L-OL will again shift the contactor back to the medium mode by energizing the medium torque mode contactor M and the time delay relay TD3 starts timing again. If before the time set on the time delay relay TD3 lapses and loading on the motor continues to increase while the motor is in the medium torque mode, the medium torque mode overloads M-OL opens and disconnects the medium torque mode contactor M and shifts the motor into the high torque mode by completing the circuit X1, M-OL, delay contact TD1A-3, M-1, L-1, H, and X2. Time delay relay TD2 is also energized and the medium torque mode overload M-OL is bypassed for a preset time by completing the circuit X1, H-1, TD2, TD1A-3, M-1, L-1, H, and X2. After the motor runs in the high torque mode for the predetermined time set on time delay relay TD2, the TD2 contact opens, thus disconnecting the high mode contactor H and the low mode contactor L will again be energized by the circuit X1, M-OL, TD1A-2, L-OL, H-3, M-3, SS4, L, and X2.

However, if before the time set on the timer TD2 lapses and loading on the motor continues to increase while the motor is in the high torque mode, the high torque mode overloads H-OL opens deenergizing the motor starter MC and shuts down the motor. The overloads H-OL also energize an overload alarm circuit by completing the circuit X1, reset pushbutton, OLR, H-OL, and X2. Contact OLR-1 bypasses the high overloads to latch the overload relay in the on position and contact over OLR-2 energizes an incandescent lamp or other monitoring means to alarm the operator. The reset pushbutton allows the operator to acknowledge the alarm condition.

It can be readily seen that there is provided in this application a novel and unique method of controlling a multiple horsepower/torque motor by sensing the loading and torque demands of the motor and changing the connection of electrical power to the windings of the motor while the meter is continously under load so that the motor windings are connected in either a full delta connection, a partial delta partial Y connection, or a full Y connection, in response to the motor loading conditions.

We claim:

1. A circuit for controlling a multi-rated motor, comprising:
    a high torque contactor for connecting electrical power to the windings of a multi-rated motor such that the windings are first connected in a Δ-delta configuration;
    (b) a first timer means electrically connected to the high torque contactor and a low torque contactor for de-energizing the high torque contactor and energizing the low torque contactor to change the connection of electrical power to the windings such that the windings are connected to a γ-wye configuration after a predetermined time interval;
    (c) a low torque overload means connected to the low torque contactor and the γ-wye connected windings for causing the low torque contactor to de-energize and energize a medium torque contactor to change the connection of electrical power to the windings such that the windings are connected in a γ-Δ-partial wye, partial delta configuration if the current in the windings exceed a predetermined current level;
    (d) a medium torque monitoring means for causing the windings to be switched back to a wye configuration after operating a predetermined time in the partial wye, partial delta configuration;
    (e) a medium torque overload means connected to the medium torque contactor and the γ-Δ partial wye, partial delta, windings for de-energizing the medium torque contactor and energizing the high torque contactor to change the connection of electrical power to the windings such that the windings are connected in a Δ-delta configuration if the current in the windings exceed a predetermined current level;

(f) a high torque monitoring means for causing the windings to be switched back to (a partial wye, partial delta) configuration after operating a predetermined time in the delta configuration; and (g) high torque overload means connected to the high torque contactor and the Δ-delta connected windings for causing the disconnection of electrical power to the windings if the current in the windings exceed a predetermined current level.

2. A circuit for controlling a multi-rated motor as recited in claim 1 wherein the medium torque monitoring means comprises a second timer means connected to the medium torque contactor and the partial wye, partial delta connected windings for causing the medium torque contactor to de-energize and the low torque contactor to energize to change the connection of electrical power to the windings such that the windings are connected in a γ-wye configuration after a predetermined time interval.

3. A circuit for controlling a multi-rated motor as recited in claim 2 wherein the high torque monitoring means comprises a third timing means connected to the high torque contactor and the Δ-delta connected windings for causing the high torque contactor to de-energize and the low torque contactor to energize to change the connection of electrical power to the windings such that the windings are connected in a γ-wye configuration after a predetermined time interval.

* * * * *